United States Patent [19]
Debenedictis
[11] 3,727,101
[45] Apr. 10, 1973

[54] LASER LAMP FAILURE DETECTION METHOD AND MEANS

[75] Inventor: Leonard Charles Debenedictis, Los Angeles, Calif.
[73] Assignee: Union Carbide Corporation, New York, N.Y.

[22] Filed: Aug. 9, 1971
[21] Appl. No.: 169,905

[52] U.S. Cl. ....................315/107, 315/119
[51] Int. Cl. ....................H05b 41/36
[58] Field of Search ....................315/107, 119–123; 328/259

[56] References Cited

FOREIGN PATENTS OR APPLICATIONS 697,096 9/1953 Great Britain ....................315/119

*Primary Examiner*—John Kominski
*Assistant Examiner*—James B. Mullins
*Attorney*—Pastoriza & Kelly

[57] ABSTRACT

Imminent failure of a lamp pump for a laser is anticipated by detecting a change in a physical dimension of the lamp normally occuring just prior to a failure. This change in physical dimension can be utilized to automatically terminate operation of the lamp.

4 Claims, 1 Drawing Figure

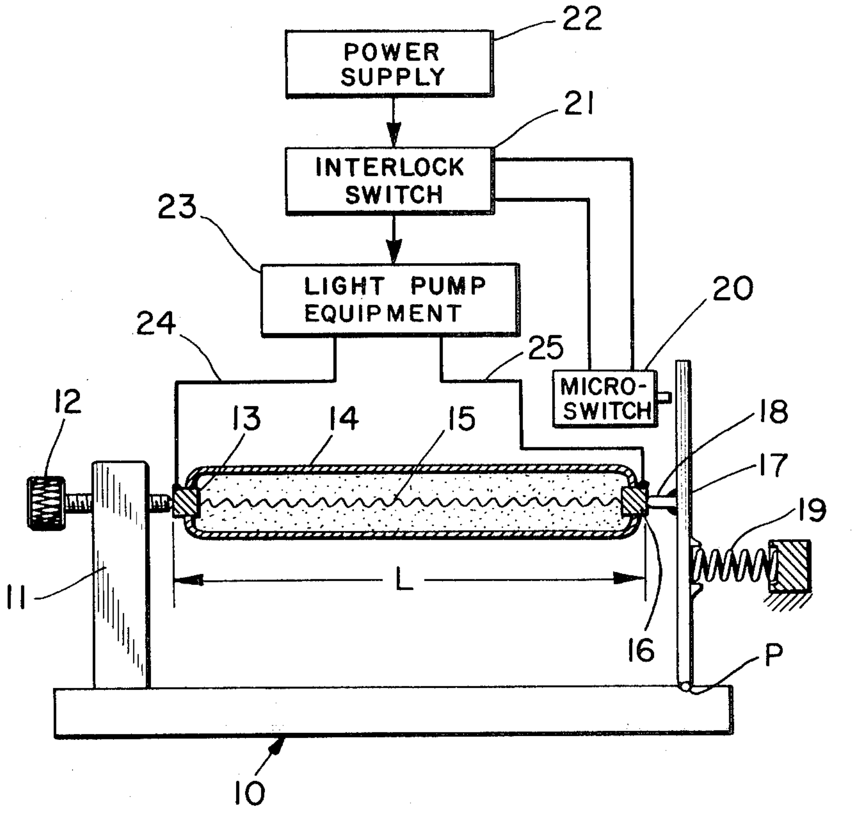
POWER SUPPLY
22
INTERLOCK SWITCH
21
LIGHT PUMP EQUIPMENT
23
24
25
20
MICRO-SWITCH
12
13
14
15
18
17
19
11
L
16
P
10

LASER LAMP FAILURE DETECTION METHOD AND MEANS

This invention relates to a method and means for detecting imminent failure of a laser lamp pump such that operation of the lamp can be terminated prior to actual failure.

BACKGROUND OF THE INVENTION

A major problem in the industrial application of certain lasers such as the YAG laser has been the loss of production time as a result of failure of the light pump lamp. In fact, the lamp can explode upon failure causing considerable damage to the laser head assembly itself.

It would be highly desirable if some method and means could be provided to anticipate such failure prior to actual failure so that the power to the lamp could be shut off and the lamp replaced before any damage occurs.

BRIEF DESCRIPTION OF THE PRESENT INVENTION

With the foregoing in mind, the present invention contemplates a method and means for anticipating just such a failure thereby significantly increasing the value of lasers to the industrial community.

More particularly, it is found that just preceeding a failure of the pumping lamp, a physical dimension of the lamp changes. In the specific case of an elongated double based tungsten halogen lamp as used with YAG lasers, the lamp tube walls become soft just prior to failure and tend to expand diametrically if a compression is exerted at opposite ends. In accord with the invention such physical dimensional change is detected and utilized to terminate operation of the lamp.

In a specific embodiment for the tungsten halogen lamp, a mounting is provided which includes biasing means exerting a compressive force on the two electrodes at opposite ends of the lamp. Softening of the lamp bulb wall will then result in the heretofore mentioned expansion diametrically which in turn results in a shortening of the overall length of the bulb. This shortening is detected by movement of an element in the mounting and such movement can be utilized to operate a micro-switch and thus terminate power passed to the lamp.

BRIEF DESCRIPTION OF THE DRAWING

A better understanding of the invention will be had by referring to the accompanying drawing illustrating diagrammatically a mounting for a laser light pump lamp wherein detection of imminent failure is accomplished.

DETAILED DESCRIPTION OF THE INVENTION

Referring to the single FIGURE, there is shown a mounting means 10 having a first upright 11 with an adjustable set screw 12. This set screw is designed to support one electrode 13 at the end of an elongated lamp bulb 14 including a lamp filament 15 making up a tungsten halogen lamp pump for a laser system. The other electrode 16 in turn is supported by a control means in the form of an upright element 17 having an engaging portion 18. A biasing means which might constitute a simple spring structure 19 urges the engaging portion 18 against the electrode 16 so that a compressive force is applied along the axis of the tube. The control element 17 may be cantilevered from the base 10 in a flexible manner or alternatively pivoted thereto so that the force from the biasing spring 19 will be transmitted to the lamp tube.

Above the lamp there is shown a micro-switch 20 positioned to be engaged by the control element 17 upon movement to the left as viewed in the drawing. This microswitch in turn connects to an interlock switch system 21 capable of removing power from a power supply 22 connected to the normal light pump equipment 23. Lines 24 and 25 leading to the electrodes 13 and 16 respectively for the lamp are shown.

OPERATION

In operation, it is found that the tube wall 14 of the lamp becomes soft just preceeding failure of the lamp. Thus, by applying a compressive force along the longitudinal axis of the lamp, the physical length dimension L will tend to shorten as the tube wall becomes soft. This shortening of the dimension results in movement of the control element 17 to the left and after sufficient shortening, the microswitch 20 will be engaged and terminate power to the lamp. It is thus possible to replace the lamp prior to actual failure or possible exploding of the lamp.

While the system has been described with respect to a double based tungsten halogen lamp as might be used with a YAG laser, the principles are applicable to any type of lamp in which softening of the lamp bulb walls occurs just preceeding failure of the lamp. It is only necessary to detect the physical change in dimension which occurs when a force is applied to the lamp itself.

What is claimed is:

1. A method of anticipating failure of a laser lamp comprising the steps of: detecting a change in a physical dimension of said lamp normally occuring just proceeding a failure of said lamp; and terminating operation of said lamp when said change is detected.

2. The method of claim 1, in which said lamp is an elongated double based tungsten halogen lamp and said detecting step includes the step of applying a compressive force to opposite ends of said lamp, said change in a physical dimension constituting a shortenting of the overall length of said lamp; and moving a control means in response to said shortening, said terminating of operation being responsive to movement of said control means.

3. A means for anticipating failure of a laser lamp wherein the lamp bulb wall softens preceeding a failure, including: a mounting for said lamp including a biasing means exerting a force on said bulb such that softening of the bulb wall will result in a change in the physical dimension of the lamp in the direction that said force is exerted; and means for detecting said change in physical dimension whereby upon detection of said change operation of said lamp can be terminated prior to failure.

4. A means according to claim 3, in which said lamp comprises an elongated tubular double based halogen lamp having electrodes at its opposite ends, said biasing means exerting a compressive force along the axis of said bulb at said electrodes, softening of the lamp bulb wall resulting in an expansion of the diameter of said bulb such that said compressing force shortens the overall length of said bulb, said means for detecting said change comprising an element in said mounting movable in response to said change; and a micro-switch positioned to be engaged by said element upon shortening of said lamp to remove power to said lamp.

* * * * *